(12) United States Patent
Fukuyama et al.

(10) Patent No.: US 8,292,021 B2
(45) Date of Patent: Oct. 23, 2012

(54) MUFFLER ASSEMBLY AND PSEUDO MUFFLER ASSEMBLY FOR A MOTORCYCLE, AND MOTORCYCLE INCORPORATING THE SAME

(75) Inventors: Kei Fukuyama, Saitama (JP); Takamasa Kojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 510 days.

(21) Appl. No.: 12/459,632

(22) Filed: Jul. 6, 2009

(65) Prior Publication Data
US 2010/0000818 A1   Jan. 7, 2010

(30) Foreign Application Priority Data

Jul. 7, 2008 (JP) ................................ 2008-177151

(51) Int. Cl.
*B60K 13/04* (2006.01)

(52) U.S. Cl. .......................... 180/309; 180/296; 180/225

(58) Field of Classification Search .................. 180/309, 180/296, 219, 225, 89.11, 89.2; 296/37.1
See application file for complete search history.

(56) References Cited

U.S. PATENT DOCUMENTS

| | | | | |
|---|---|---|---|---|
| 4,441,574 A * | 4/1984 | Kohyama et al. | ............. | 180/219 |
| 5,183,130 A * | 2/1993 | Nakamura et al. | ............ | 180/219 |
| 6,615,945 B2 * | 9/2003 | Minami et al. | ................ | 180/219 |
| 6,651,767 B2 * | 11/2003 | Izawa et al. | ................... | 180/219 |
| 7,156,199 B2 * | 1/2007 | Takano | ......................... | 180/309 |
| 7,422,084 B2 * | 9/2008 | Mochizuki et al. | ........... | 180/227 |
| 7,438,738 B2 * | 10/2008 | Uneta et al. | .................. | 55/385.3 |
| 7,520,359 B2 * | 4/2009 | Iwanaga | ......................... | 180/219 |
| 7,562,734 B2 * | 7/2009 | Yano et al. | .................... | 180/219 |
| 7,635,140 B2 * | 12/2009 | Konno et al. | ............... | 280/152.1 |
| 7,748,746 B2 * | 7/2010 | Beiber Hoeve et al. | ...... | 280/835 |
| 7,793,747 B2 * | 9/2010 | Brown | .......................... | 180/219 |
| 2007/0145227 A1 * | 6/2007 | Hasegawa | ..................... | 248/637 |
| 2008/0110155 A1 * | 5/2008 | Harada | ........................... | 60/276 |

FOREIGN PATENT DOCUMENTS

JP          58-43508         10/1983

* cited by examiner

*Primary Examiner* — Katy M Ebner
(74) *Attorney, Agent, or Firm* — Carrier Blackman & Associates, P.C.; William D. Blackman; Joseph P. Carrier

(57) ABSTRACT

A motorcycle includes a muffler assembly including a muffler and a muffler cover arranged on one side of a rear wheel in a lateral direction. The motorcycle also includes a housing box resembling the muffler assembly and arranged substantially parallel to the muffler assembly on the other side of the rear wheel in the lateral direction. The housing box has a shape substantially similar to a shape of the muffler assembly, thereby forming a pseudo muffler assembly or replica muffler assembly.

17 Claims, 13 Drawing Sheets

MUFFLER ASSEMBLY AND PSEUDO MUFFLER ASSEMBLY FOR A MOTORCYCLE, AND MOTORCYCLE INCORPORATING THE SAME

CROSS-REFERENCE TO RELATED APPLICATIONS

The present invention claims priority under 35 USC 119 based on Japanese patent application No. 2008-177151, filed on Jul. 7, 2008. The entire subject matter of this priority document, including specification claims and drawings, is incorporated by reference herein.

BACKGROUND OF THE INVENTION

1. Field of the Invention

The present invention relates to a motorcycle having a muffler assembly and a housing box resembling the muffler assembly, where the muffler assembly and the housing box are disposed parallel to each other in a balanced, substantially symmetrical manner at a rear portion of the motorcycle. More particularly, the present invention relates to motorcycle having the housing box arranged at least on one of a right side or a left side of a rear wheel, and attached to a rear portion of a body frame of the motorcycle, and a muffler assembly having a muffler forming a part of an exhaust system arranged on the other of the right or the left side of the rear wheel.

2. Description of the Background Art

There is a known motorcycle having a pair of right and left housing boxes, and a pair of right and left mufflers arranged on both sides of a rear wheel. An example of such motorcycle is disclosed in the Japanese Patent document JP-Y No. 1983-43508.

However, when configuration that each housing box is arranged on both sides of a rear wheel, such as disclosed in the Japanese Patent document JP-Y No. 1983-43508, is applied to a sport-type motorcycle, e.g., an off-road type motorcycle, the rear portion of the vehicle body and vicinity thereof undesirably becomes bulky.

Such arrangement of a plurality of housing boxes and mufflers results in a poor appearance quality and compromises correspondence to promptness and appearance for a sport-type motorcycle, such as an off-road type vehicle. Accordingly, a consideration for appearance quality and desired promptness (providing appropriate shape, e.g. an ergonomic shape, etc.) is required.

The present invention is made in view of such a situation. Accordingly, it is one of the objects of the present invention to prevent or at least minimize the vicinity of the rear of a vehicle body from being bulky, to secure sportive promptness, to also enhance appearance quality and to provide a motorcycle suitable for sports, such off road activities.

SUMMARY OF THE INVENTION

In order to achieve the above objects, the present invention according to a first aspect thereof provides a motorcycle having a housing box arranged on one of a right side or a left side of a rear wheel, and attached to a rear portion of a body frame, and a muffler as a part of an exhaust system of an engine mounted on the body frame arranged at least on the other of the right or the left side of the rear wheel.

The present invention according to the first aspect is characterized in that a muffler assembly including the muffler and a muffler cover that covers the muffler is arranged on the one side in a lateral direction of the rear wheel, and a single housing box having a shape similar to a shape of the muffler assembly thereby forming a pseudo muffler assembly, is arranged on the other side in the lateral direction of the rear wheel, substantially parallel to the muffler assembly.

The present invention according to a second aspect thereof, in addition to the first aspect, is characterized in that the muffler cover has a substantially L-shaped (L-type) cross section; and that the muffler cover is configured to cover the muffler from the upper and outer side portions thereof.

The present invention according to a third aspect thereof, in addition to one of the first and second aspects, is characterized in that a seat is attached at a rear portion of the body frame, and a pair of left and right rear side covers are disposed below the seat. The left and right lateral portions of the body frame are covered with said left and right rear side covers below the seat. The muffler assembly is arranged under one of said left and right rear side covers, and the housing box is arranged under the other of said left and right rear side covers.

The present invention according to a fourth aspect thereof, in addition to one of the first, second and third aspects, is characterized in that the housing box includes a box body having an upper portion thereof open upwardly and outwardly, and a lid having a shape substantially similar a shape of the muffler cover, with a substantially L-shaped (L-type) cross section, so as to close an opening of the box body, and covering the box body with the lid attachable/detachable in a vehicle-width direction. A color of the lid is substantially similar to a color of the muffler cover.

Further, the present invention according to a fifth aspect thereof, in addition to one of the first, second, third and fourth aspects, characterized in that an ABS modulator for executing antilock brake control is housed in the housing box.

EFFECTS OF THE INVENTION

According to the present invention, as disclosed in one of the first through fifth aspects, since the muffler assembly including the muffler and the muffler cover that covers the muffler is arranged on one side in the lateral direction of the rear wheel, and the housing box having a similar shape to that of the muffler assembly and thereby forming a pseudo muffler assembly is arranged on the other side in the lateral direction of the rear wheel substantially in parallel with the muffler assembly, the vicinity of the rear of the vehicle body is prevented from becoming bulky.

Also, since the muffler assembly and the housing box having the substantially similar shapes, are arranged on both sides of the rear wheel, the effect of rectification of running wind in the lateral direction of the motorcycle can be equalized. Also, a sportive promptness of the motorcycle can be enhanced. Further, the appearance like twin mufflers can be acquired because the housing box looks similar to the muffler assembly. Accordingly, a motorcycle suitable for a sport type can be provided.

According to the present invention, particularly as disclosed in the fourth aspect, since the lid configuring of housing box in collaboration with the box body covers the box body such that the lid is attachable/detachable in the vehicle-width direction, the rear side cover on the upper side portion of the housing box is prevented from obstructing the attachment/detachment of the lid. Accordingly, work for attaching/detaching the lid to the body box can be facilitated.

Besides, as the upper portion of the box body is open at the upper and outer side portions thereof, and the lid has the substantially L-type cross section to close the opening of the box body, the opening of the box body when the lid is removed is enlarged and work for housing/removing a housed article (e.g., an operational element) in/from the housing box can be easily facilitated.

In addition, since the lid has a color substantially similar to a color of the muffler cover, and is formed in the substantially same shape as the muffler cover, the housing box looks alike the muffler assembly and the appearance like twin mufflers can be more easily acquired.

According to the present invention, particularly as disclosed in the fifth aspect, since the ABS modulator is disposed in the housing box, the appearance quality is enhanced. Since the ABS modulator is hidden in the housing box, the ABS modulator can be protected. The ABS modulator is arranged in dead space and a degree of freedom in layout is enhanced. In addition, the weight on the side of the housing box is made close to the weight on the side of the muffler assembly, and a lateral weight balance for the motorcycle can be improved.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An illustrative embodiment of the present invention shown in the attached drawings is described below.

Figure 1:
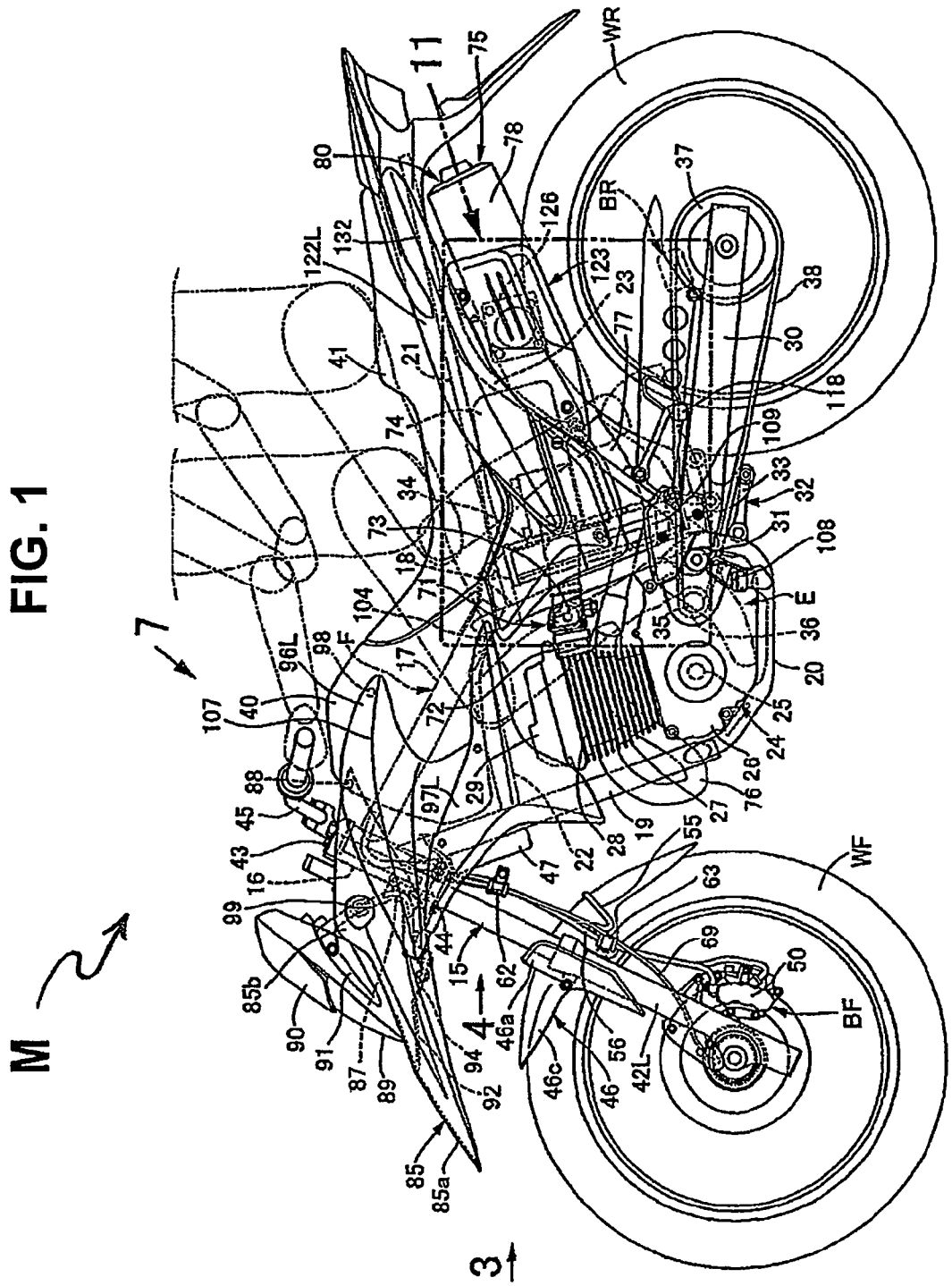
FIG. 1 is a left side view showing a motorcycle.
Figure 2:
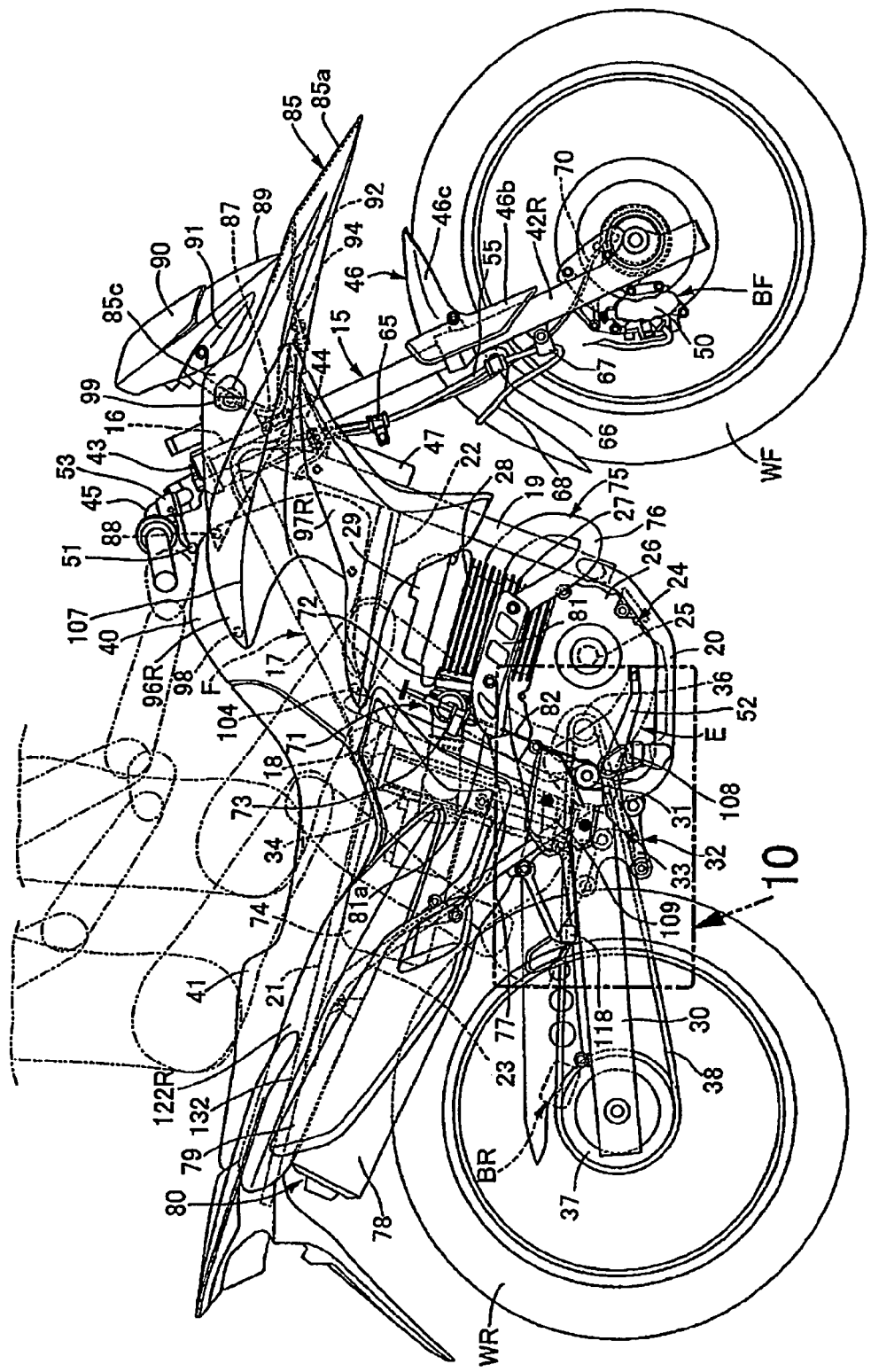
FIG. 2 is a right side view showing the motorcycle.

FIGS. 1 to 13 depict a motorcycle M according to a selected illustrative embodiment of the present invention. As shown in FIGS. 1 and 2, a body frame F of the off-road type motorcycle M includes a head pipe 16 that steerably supports front forks 15 supporting a front wheel WF via an axle at its lower end, a main pipe 17 extended rearwardly and downwardly from the head pipe 16, a pair of right and left center pipes 18 extended downwardly from a rear end of the main pipe 17, a down pipe 19 inclined at a sharper angle than the main pipe 17 and extended rearwardly and downwardly from the head pipe 16, and a pair of right and left lower pipes 20 that fasten a rear end of the down pipe 19 and each center pipe 18.

The body frame F further includes a pair of right and left seat rails 21 extended rearwardly and upwardly from an upper portion of each center pipe 18, a reinforcing pipe 22 fastening the main pipe 17 and an intermediate portion of the down pipe 19, and extended rearwardly and upwardly, and a pair of right and left rear stays 23 each fastening a lower portion of both center pipes 18 and each intermediate portion of both seat rails 21 and extended rearwardly and upwardly. Each center pipe 18 and each lower pipe 20 are integrated.

An engine body 24 of an engine E which is an air-cooled single-cylinder 4-cycle engine is mounted inside the body frame F such that the engine enclosed by the rear of the main pipe 17, both center pipes 18, a lower portion of the down pipe 19 and both the lower pipes 20.

The engine body 24 is provided with a crankcase 26 that rotatably supports a crankshaft 25 having an axis in a vehicle-width direction, a cylinder block 27 connected to an upper portion on the front side of the crankcase 26 and raised upwardly, a cylinder head 28 connected to an upper end of the cylinder block 27 and a head cover 29 connected to an upper end of the cylinder head 28.

A supporting member 31 that vertically swingably supports a front end of a swing arm 30 is provided at a lower portion of the center pipe 18. A rear wheel WR is supported at a rear end of the swing arm 30 via an axle. A link mechanism 32 is provided between the lower portion of the center pipe 18 and the front portion of the swing arm 30. A rear shock absorber (rear cushion unit) 34 is arranged between a link member 33 of the link mechanism 32 and a rear end of the main pipe 17.

A gear transmission (not shown) is housed in the crankcase 26. The gear transmission shifts the rotary power of the crankshaft 25. An output shaft 35 of the gear transmission is protruded sideways from a left wall of the crankcase 26. A looped chain 38 is wound onto a driving sprocket 36 fixed to an end of the output shaft 35 protruded from the crankcase 26 and onto a driven sprocket 37 coaxially provided to the rear wheel WR. The output of the gear transmission is transmitted to the side of the rear wheel WR via the chain 38.

A fuel tank 40 is mounted on the main pipe 17 at a position located above the engine body 24. A tandem seat 41 is arranged at a rear of the fuel tank 40. The seat 41 is supported by both the seat rails 21.

Figure 3:
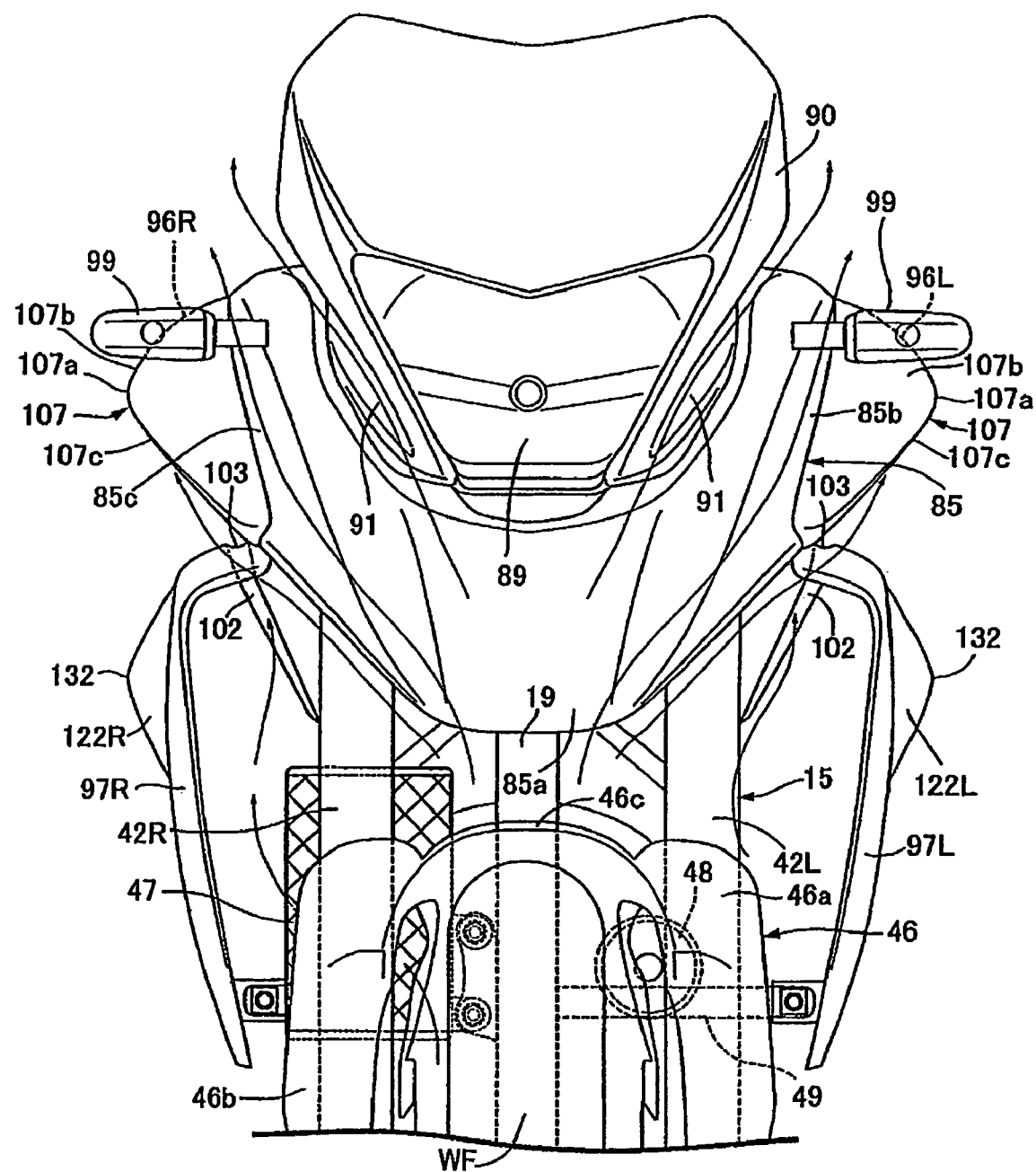
FIG. 3 is a front view viewed from a direction shown by an arrow 3 in FIG. 1.
Figure 4:
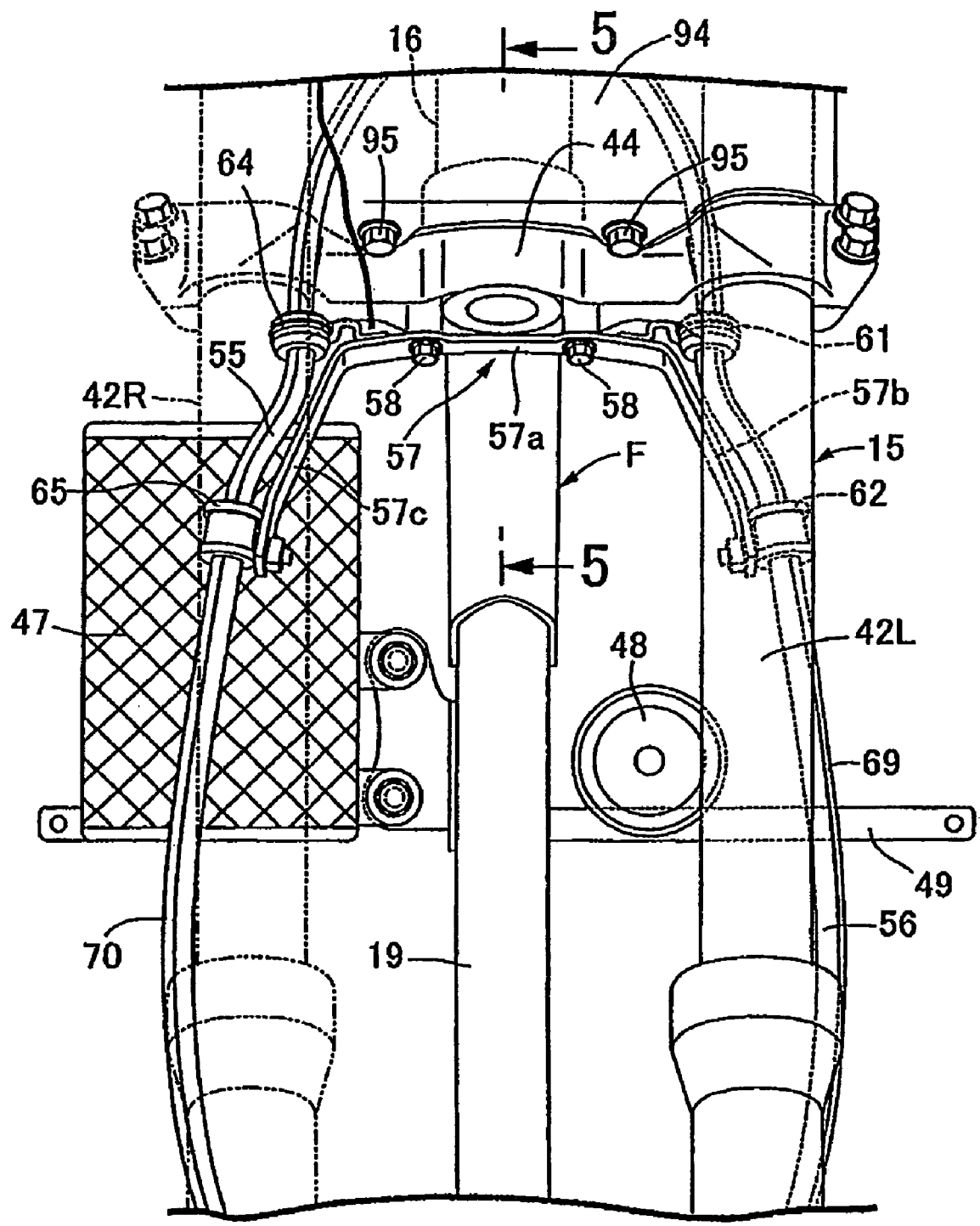
FIG. 4 is an enlarged view viewed from a direction shown by an arrow 4 in FIG. 1.

As shown in FIGS. 3 and 4, the front fork 15 is configured by a pair of left and right telescopically-formed shock absorbers (cushion units) 42L, 42R. The telescopically-formed shock absorbers 42L, 42R are arranged on both sides of the front wheel WF and vertically extended. A top bridge 43 (see FIGS. 1 and 2) couples upper ends of both shock absorbers 42L, 42R. A bottom bridge 44 couples upper portions of both shock absorbers 42L, 42R below the top bridge 43. The front wheel WF is supported between lower ends of both shock absorbers 42L, 42R by a shaft. A steering handlebar 45 is fixed to the top bridge 43 at a center portion of in a lateral direction.

A lower fender 46 that covers the front wheel WF from the upside is provided between both shock absorbers 42L, 42R under the bottom bridge 44. A pair of left and right supporting portions 46a, 46b is attached to both shock absorbers 42L, 42R. A cover 46c is provided between the supporting portions 46a, 46b to cover the front wheel WF from the upside and is integrated with the support portions to form the lower fender 46. The lower fender 46 including the supporting portions 46a, 46b and the cover 46c is formed of material comprising synthetic resin.

An oil cooler 47 is arranged in front of the engine body 24 on the right side of the down pipe 19. The oil cooler 47 is attached to the down pipe 19. A horn 48 arranged on a side of the down pipe 19 opposite to the side on which the oil cooler is attached to the down pipe 19. The horn is supported a supporting stay 49 fastened to the down pipe 19.

A caliper 50 of a disc brake BF for a front wheel is installed on the left side of the front wheel WF. The caliper is attached to a lower portion of the left shock absorber 42L. The disc brake BF for the front wheel is in a normal brake condition when braking force is exercised according to the operation of a brake lever 51. The brake lever 51 is turnably attached to the right side of the steering handlebar 45.

During operation, the brake lever 51 is turned in an interlock brake condition in which the brakes are applied in interlock with a disc brake BR for a rear wheel installed on the rear wheel WR when a brake pedal 52 is turned. The brake pedal 52 is turnably supported by the right lower pipe 20 of the body frame F.

In other words, a brake hose 55—for a normal brake that conducts hydraulic pressure from a master cylinder 53 attached to the steering handlebar 45 so as to exercise braking hydraulic pressure according to the operation of the brake lever 51 and a brake hose 56 for an interlock brake that conducts hydraulic pressure from a master cylinder 54 (see FIG. 10) attached to the lower portion of the right center pipe 18 of the body frame F so as to exercise braking hydraulic pressure according to the operation of the brake pedal 52—are connected to the caliper 50 of the disc brake BF for the front wheel.

Figure 5:
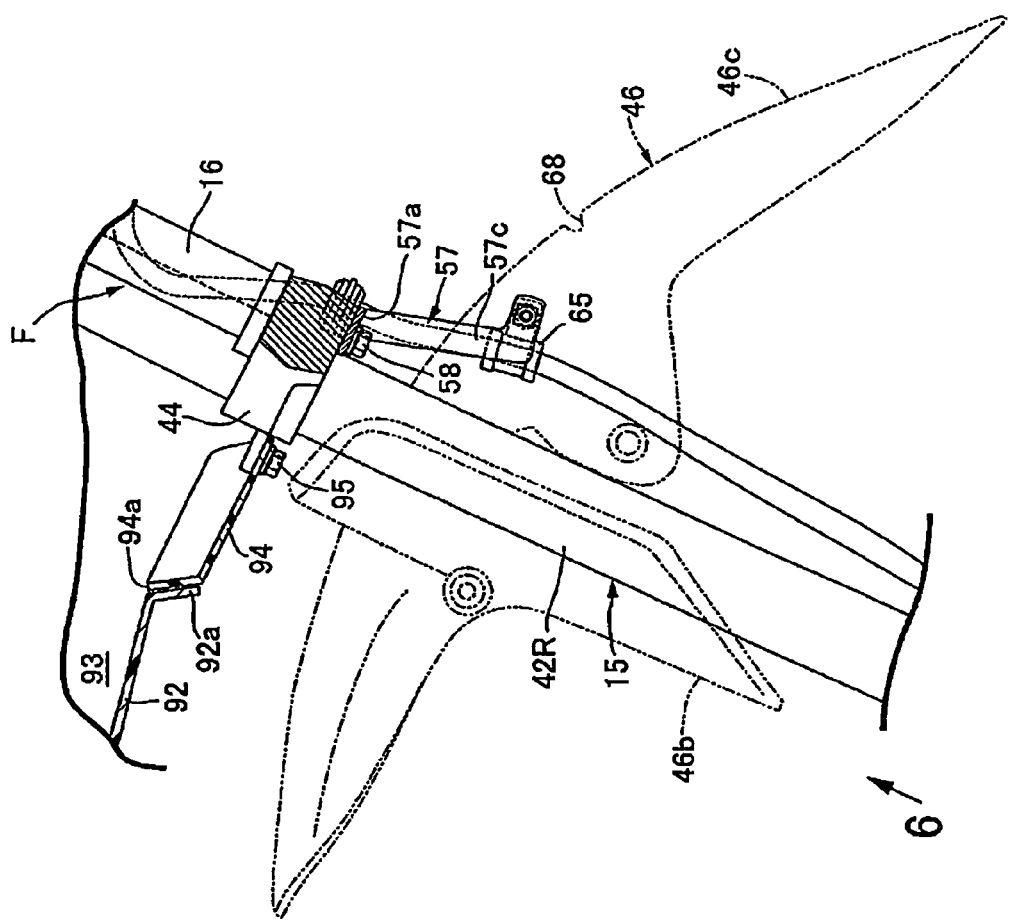
FIG. 5 is a sectional view viewed along a line 5-5 in FIG. 4.
Figure 6:
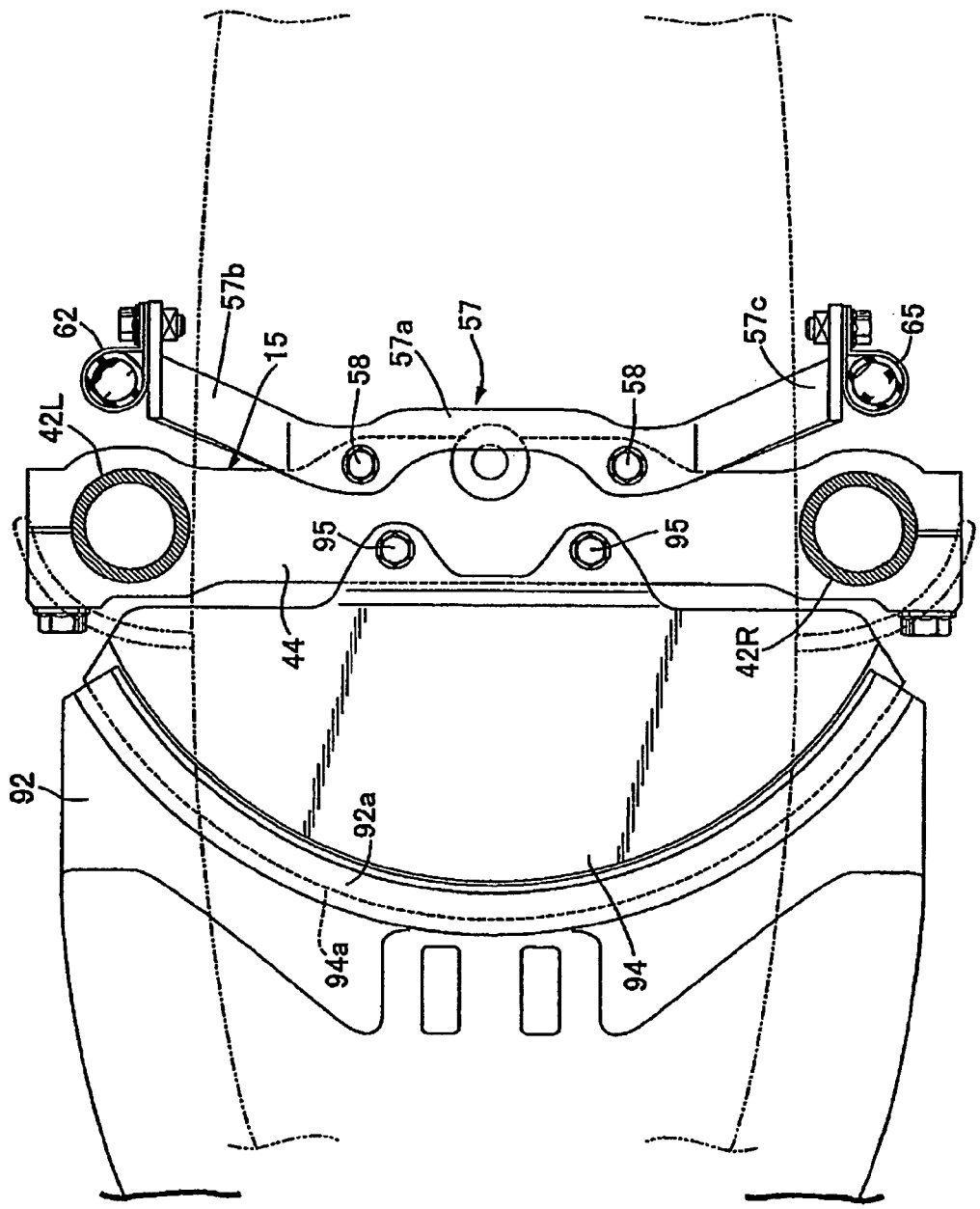
FIG. 6 is an arrow view viewed from a direction shown by an arrow 6 in FIG. 5.

As also shown in FIGS. 5 and 6, a stay 57 is attached to the bottom of the bottom bridge 44 in the front fork 15. A mounting plate 57a and supporting plates 57b, 57c are integrated to form the stay 57. The mounting plate 57a fastened to the bottom of the bottom bridge 44 by a pair of bolts 58. The pair of left and right supporting plates 57b, 57c integrated with both ends of the mounting plate 57a and extended downwardly. Both supporting plates 57b, 57c are inclined so that an interval between them is wider downward.

In other words, the stay 57 is formed in the shape of a trapezoid made wider downward so as to avoid interference with the cover 46c and to straddle the cover 46c when the shock absorbers 42L, 42R of the front fork 15 are most reduced (compressed), and the cover 46c of the lower fender 46 is brought closest to the bottom bridge 44, as shown by a chain line in FIG. 5.

In addition, second and fifth clamping members 62, 65 are attached to lower ends of the supporting plates 57b, 57c of the stay 57. However, when the cover 46c of the lower fender 46 is located closest to the bottom bridge 44, the second and fifth clamping members 62, 65 are never touched to the cover 46c or do not interfere with the cover though they are overlapped with the cover 46c of the lower fender 46, when viewed in a side view.

A first clamping member 61 is fixed to a top face at a left end of the mounting plate 57a of the stay 57. A second clamping member 62 is attached to the lower end of the left supporting plate 57b of the stay 57. The second clamping member 62 located below the first clamping member 61. A third clamping member 63 (see FIG. 1) located below the second clamping member 62 is attached to the left side of the lower fender 46.

The brake hose 56 for the interlock brake is vertically extended at the back of the left shock absorber 42L with the brake hose inserted and held into/by the first to third clamping members 61, 62, 63 and a lower end of the brake hose 56 for the interlock brake is connected to the caliper 50 arranged on the left side of the front wheel WF.

A fourth clamping member 64 is fixed to a top face at a right end of the mounting plate 57a of the stay 57. The fifth clamping member 65 is attached to the lower end of the right supporting plate 57c of the stay 57. The fifth clamping member 65 is located below the fourth clamping member 64. A sixth clamping member 66 (see FIG. 2) is located below the fifth clamping member 65. The sixth clamping member is attached to the right side of the lower fender 46. The brake hose 55 for the normal brake is vertically extended at the back of the right shock absorber 42R with the brake hose inserted and held into/by the fourth through the sixth clamping members 64, 65, 66.

A bend holding member 67 is attached to the right shock absorber 42R below the sixth clamping member 66. A bent part bent upwardly below the sixth clamping member 66 of the brake hose 55 for the normal brake is held by the bend holding member 67.

In addition, the brake hose 55 for the normal brake extended upwardly from the bend holding member 67 is fitted into a fitting concave portion 68 (see FIGS. 2 and 5) provided to an upper portion of the lower fender 46 at the back of the front fork 15, is extended on the right side of the front wheel WF, and is connected to the caliper 50.

A rotary (revolution) speed sensor for ABS (not shown) is attached to the left side of the front wheel WF. The rotary speed sensor detects the rotary speed of the front wheel WF for executing antilock brake control. A cable 69 connected to the rotary speed sensor for ABS is inserted, and held into/by the first to the third clamping members 61, 62, 63 together with the brake hose 56 for the interlock brake.

Further, a wheel speed sensor (not shown) is attached to the right side of the front wheel WF. A cable 70 connected to the wheel speed sensor is inserted and held into/by the fourth to the sixth clamping members 64, 65, 66 together with the brake hose 55 for the normal brake.

An intake system 71 is connected to a rear side wall of the cylinder head 28 in the engine body 24. The intake system 71 is provided with a carburetor 73. A downstream end of a carburetor 73 is connected to the cylinder head 28 via an intake pipe 72. An air cleaner 74 is arranged at rear of the carburetor 73, and is connected to an upstream end of the carburetor 73.

An exhaust system 75 is connected to a front side wall of the cylinder head 28. The exhaust system 75 includes a first exhaust pipe 76 having an upstream end thereof connected to the cylinder head 28, a second exhaust pipe 77 having an upstream end thereof connected to a downstream end of the first exhaust pipe 76, and a muffler 78 connected to a downstream end of the second exhaust pipe 77.

The first exhaust pipe 76 is curved such that it is extended rearwardly on the right side of the cylinder block 27 from the front side wall of the cylinder head 28. The second exhaust pipe 77 is extended rearwardly through the inside of the right center pipe 18 of the body frame F and the inside right rear stay 23. The downstream end of the second exhaust pipe 77 is connected to the muffler 78 extended rearwardly and upwardly on the right upside of the rear wheel WR.

A muffler cover 79 having a L type (L-shaped) cross section is attached to the muffler 78 for covering the muffler 78 from the upside and the outside portions thereof. The muffler 78 and the muffler cover 79 configure a muffler assembly 80 in collaboration. The muffler assembly 80 is arranged on the right side of the rear wheel WR.

As shown in FIG. 2, a connected portion of the first and second exhaust pipes 76, 77 is covered with a protector 81 from the side. The protector 81 is fastened to the first and second exhaust pipes 76, 77. In addition, the protector 81 is integrated with a rearwardly extended portion 81a (see FIG. 2) extended in the vicinity of the center pipe 18 of the body frame F. A clutch cable 82 is covered with the rearwardly extended portion 81a from the outside. The clutch cable 82 is vertically extended and arranged on the right side of the rear of the engine body 24 is covered with the rearwardly extended portion 81a from the outside.

The lower fender 46 attached to the front fork 15 is covered with an upper fender 85 from the upside and at least a portion of the fuel tank 40 mounted on the main pipe 17 of the body frame F at the back of the head pipe 16. A pair of left and right front side cowls 96L, 96R which cover the front of the fuel tank 40 from the side, in this embodiment, range from the rears on both sides of the upper fender 85.

Figure 7:
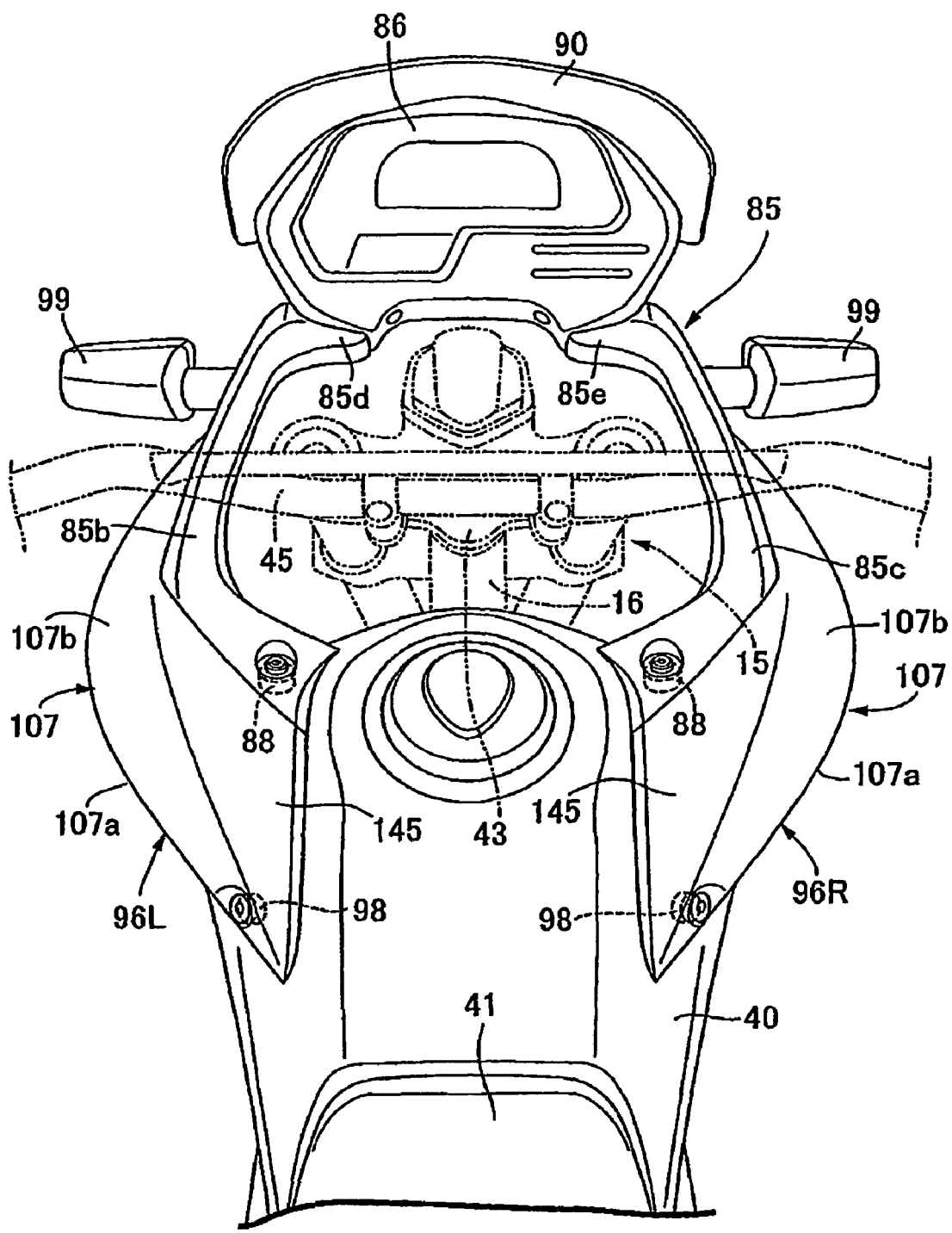
FIG. 7 is an arrow view viewed from a direction shown by an arrow 7 in FIG. 1.

As shown in FIG. 7, when viewed in a side view, the upper fender 85 is formed in the shape of a beak. The upper fender is extended in front of the lower fender 46 over the lower fender 46. A front fender 85a and both the fender rears 85b, 85c are integrated to form the upper fender 85. The fender front 85a arranged in front of the head pipe 16 and a pair of the left and right fender rears 85b, 85c extended rearwardly from the rears on both sides of the fender front 85a. The front portions of both the fender rears 85b, 85c formed to cover the front portion of the fuel tank 40 from the side are fixed to a stay 87 fastened to the front of the head pipe 16. The rear ends of both fender rears 85b, 85c are fixed to supporting members 88 fastened to both sides of the front of the fuel tank 40.

An upper portion on the rear side of the fender front 85a of the upper fender 85 is open rearwardly substantially in a U-shape. A lower portion of a headlight cover 90 that covers a headlight 89 is inserted into an open portion of the fender front 85a from the upside.

In other words, the lower portion of the headlight cover 90 and the upper portion of the fender front 85a of the upper fender 85 are arranged in a overlapped manner, when viewed in a side view. In addition, the headlight cover 90 is supported by the stay 87 fastened to the front of the head pipe 16.

An instrument panel 86 is arranged at a rear of the headlight cover 90. The instrument panel 86 is covered with the headlight cover 90 protruded upwardly from an upper portion on the front side of the upper fender 85 from the front side. The instrument panel 86 is supported by the stay 87.

Further, each projection 85d, 85e of the upper fender 85 protruded inwardly is integrated with each intermediate portion of the fender rears 85b, 85c of the upper fender 85. Each projection 85d, 85e of the upper fender 85 is arranged at the same level as each lower portion on both sides of the instrument panel 86. Each concave portion 91 is formed on both sides of the headlight cover 90, and extended rearwardly and upwardly.

A concave portion 93 is formed in the fender front 85a of the upper fender 85. The concave portion is made open upwardly so as to touch to the bottom of the headlight cover 90 using a bottom plate 92 ranging in a body from the fender front 85a as a lower closed end, as shown in FIGS. 5 and 6, so as to house the lower portion of the headlight cover 90. A mud guard 94 is attached to the bottom bridge 44 of the front fork 15 by plural bolts 95, and extended forwardly toward the bottom plate 92.

In addition, a rear circular arc wall 92a is integrated with a rear edge of the bottom plate 92. The rear circular wall 92a is extended rearwardly and downwardly in the shape of a circular arc with the axis of the head pipe 16 in the center. A front circular arc wall 94a extended forward and upwardly opposite to the rear circular arc wall 92a from the rear side. A front circular arc wall 94a is formed in the shape of a circular arc with the axis of the head pipe 16 in the center is integrated with the front of the mud guard 94.

During operation, mud and others splashed up into the upper fender 85 by the front wheel WF are prevented from being scattered at a rear of the head pipe 16 through the upper fender 85 upwardly by the bottom plate 92 and the mud guard 94.

An interval between the rear circular arc wall 92a and the front circular arc wall 94a is fixedly held by the steering operation of the steering handlebar 45, since the rear circular arc wall 92a at the rear edge of the bottom plate 92, and the front circular arc wall 94a formed in the front of the mud guard 94 opposite to the rear circular arc wall 92a from the rear side are in the shape of a circular arc with the axis of the head pipe 16 as its center.

The pair of left and right front side cowls 96L, 96R are detachably attached to the upper fender 85. A portion of each front side cowls 96L, 96R is overlapped with a lower portion on the rear side of respective fender rear 85b, 85c of the upper fender 85. The shrouds 97L, 97R covering the oil cooler 47 attached to the down pipe 19 are coupled to both front side cowls 96L, 96R.

An upper portion of each of the front side cowls 96L, 96R is arranged below the rear side of each fender rear 85b, 85c of the upper fender 85 such that the upper portion of the front side cowls 96L, 96R is overlapped from the outside. The rear portion of each front side cowl 96L, 96R is fixed to a respective one of stays 98 fastened to the side of the fuel tank 40. The front portion of each front side cowl 96L, 96R is fixed to the stay 87 fastened to the head pipe 16. Each turn signal lamp 99 protruded sideways from the front of each front side cowl 96L, 96R is attached to the stay 87 fastened to the head pipe 16.

Figure 8:
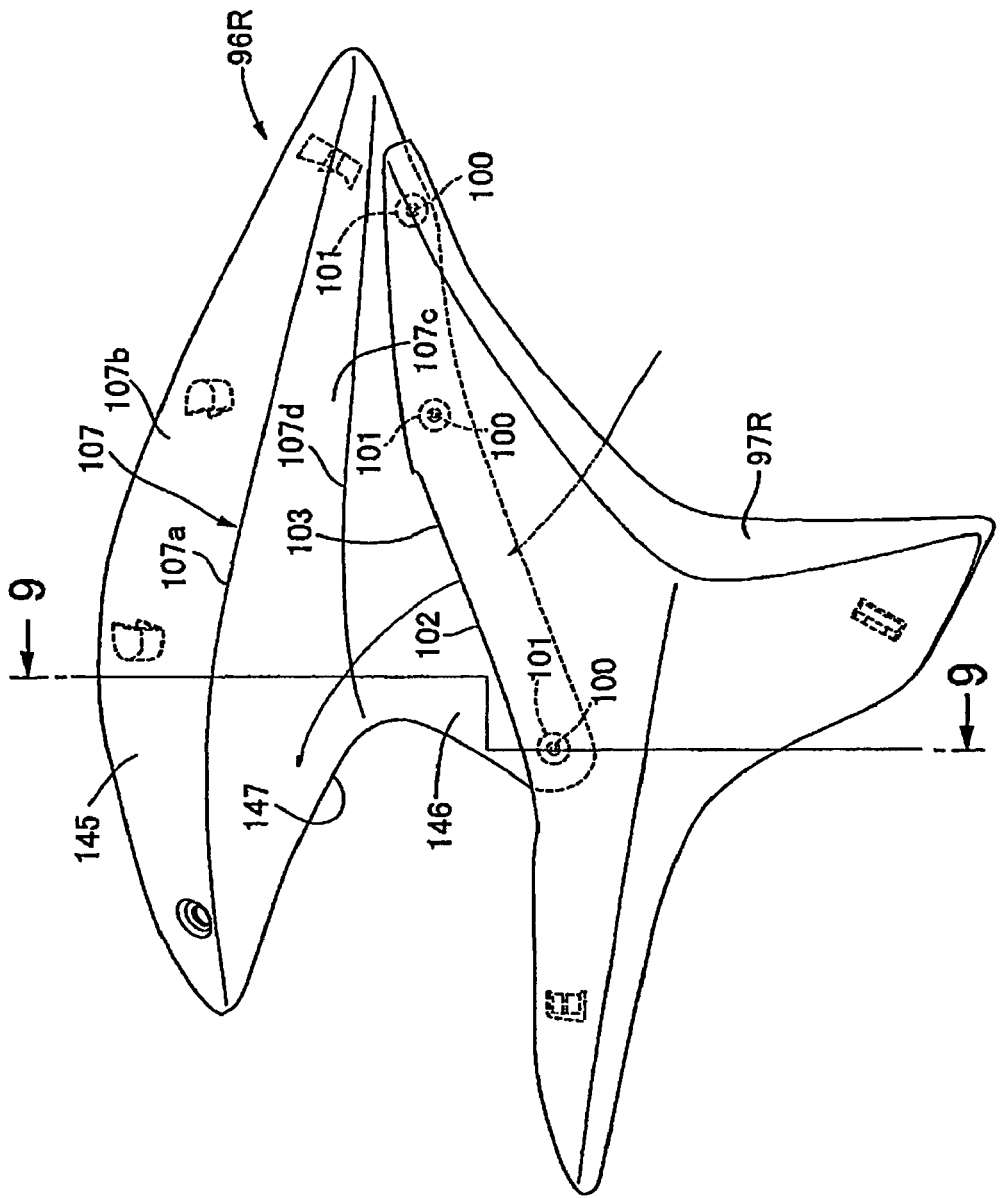
FIG. 8 is a side view showing a front side cowl and a shroud.

As shown in FIG. 8, the right front side cowl 96R is configured by integrating an upper extended portion 145 and a lower extended portion 146. The upper extended portion 145 is extended rearwardly from an intermediate portion in a longitudinal direction of the upper fender 85 toward the upside of a rider's knee on the seat 41. The lower extended portion 146 is extended at the rear of the oil cooler 47, when viewed in a side view, from the intermediate portion in the longitudinal direction of the upper fender 85. The integrated upper extended portion 145 and the lower extended portion 146 form a substantially V-type concave portion 147 open rearwardly between the rear of the upper extended portion 145 and the lower extended portion 146.

Figure 9:
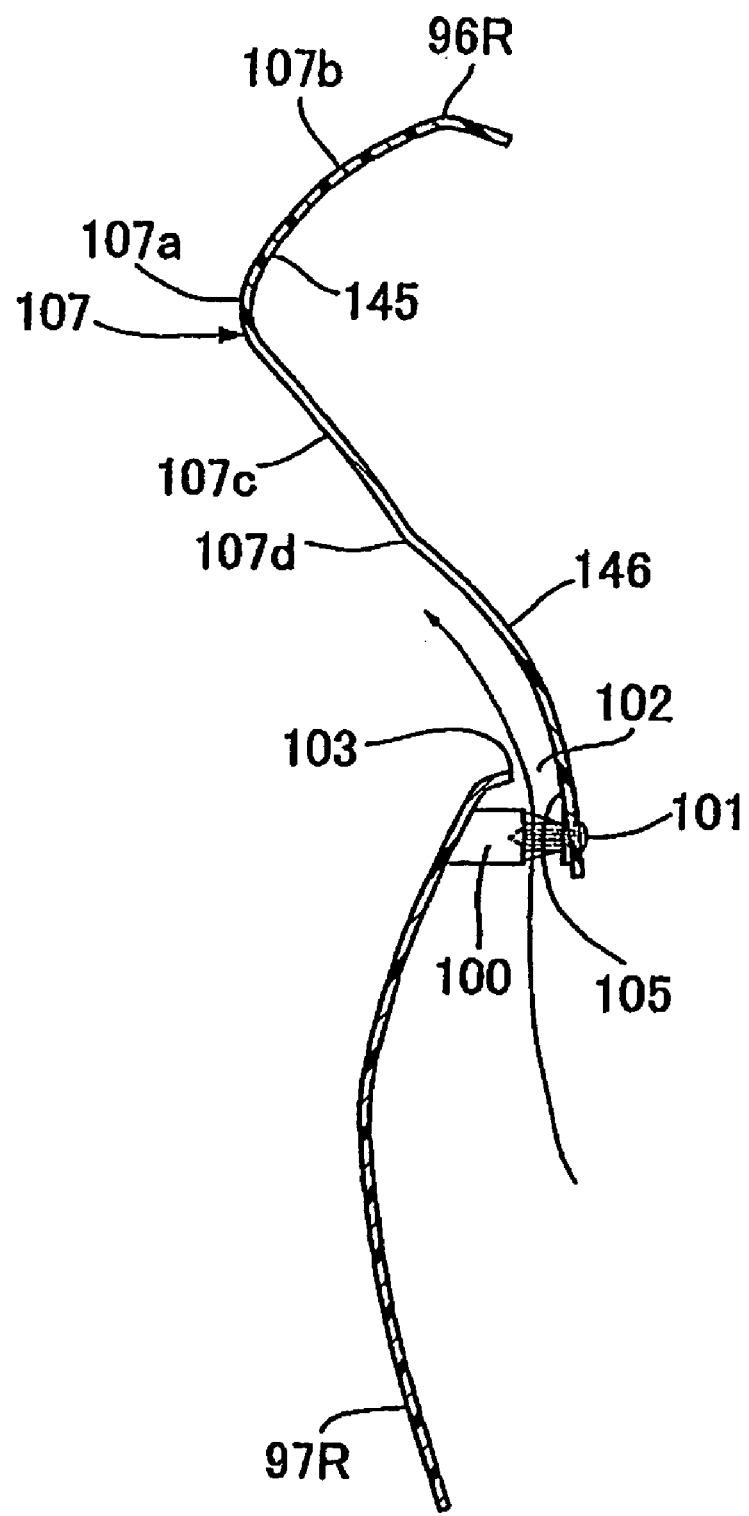
FIG. 9 is a sectional view viewed along a line 9-9 in FIG. 8.

The right front side cowl 96R and the right shroud 97R are coupled with each other such that, when viewed from the outside, an upper portion of the shroud 97R is overlapped with a lower portion of the front side cowl 96R. The upper portion of the shroud 97R is coupled to the lower portion of the front side cowl 96R by touching the surface of the lower portion of the front side cowl 96R a plural locations. For example, as shown in FIGS. 8 and 9, three bosses 100 are integrated with the surface of the upper portion of the shroud 97R, and protruded on the side of the front side cowl 96R, and screws 101 are inserted into the lower portion of the front side cowl 96R from the side of the back to each boss.

In addition, a airflow routing groove 105 is formed between the lower portion of the rear side of the front side cowl 96R and the upper portion of the shroud 97R. The airflow routing groove 105 is extended in the longitudinal direction, and is opened downwardly. A cutout 103 is provided at the upper portion of the shroud 97R. The cut out 103 forms an exhaust port 102 vertically directed along the airflow routing groove 105 between the upper portion of the shroud 97R and the lower portion of the front side cowl 96R.

The rear of the shroud 97R is attached to a stay 104 (see FIG. 2) fastened to the side of the rear of the fuel tank 40. And a lower portion of the shroud 97R is attached to the oil cooler 47.

The left front side cowl 96L and the left shroud 97L are configured in a similar manner as the right front side cowl 96R and the right shroud 97R are configured. However, a lower portion of the left shroud 97L is attached to the supporting stay 49 fastened to the down pipe 19 having the horn 48 supported thereon.

Each overhanged portion 107 is provided to the right front side cowl 96R and the left front side cowl 96L with the overhanged portion overhanged outside in the vehicle-width direction. Each of the overhanged portions 107 forms ridge line portion 107a linearly ranging to a lower edge of the upper fender 85, when viewed in a side view. A cross section of each overhanged portion is substantially V-type.

For each overhanged portion 107, an upper inclined portion 107b and a lower inclined portion 107c are formed on the upside and on the downside of the ridge line portion 107a. The upper inclined portion 107b is inclined to be located on the upside toward the inside in the vehicle-width direction, and extended to an upper portion on the front side of the fuel tank 40. The lower inclined portion 107c is inclined to be located on the downside toward the inside in the vehicle-width direction, and extended to a lower portion on the front side of the fuel tank 40. The upper inclined portion 107b and the lower inclined portion 107c are respectively provided to the front side cowls 96L, 96R.

In addition, a bent line 107d is formed in an intermediate portion of the lower inclined portion 107c on a boundary of the upper extended portion 145 and the lower extended portion 146, and extended in the longitudinal direction. The bent line 107d is bent with the bent line protruded outwardly in the vehicle-width direction. A portion lower than the bent line 107d in the lower inclined portion 107c is abruptly inclined inward in the vehicle-width direction, compared with a portion higher than the bent line 107d.

Figure 10:
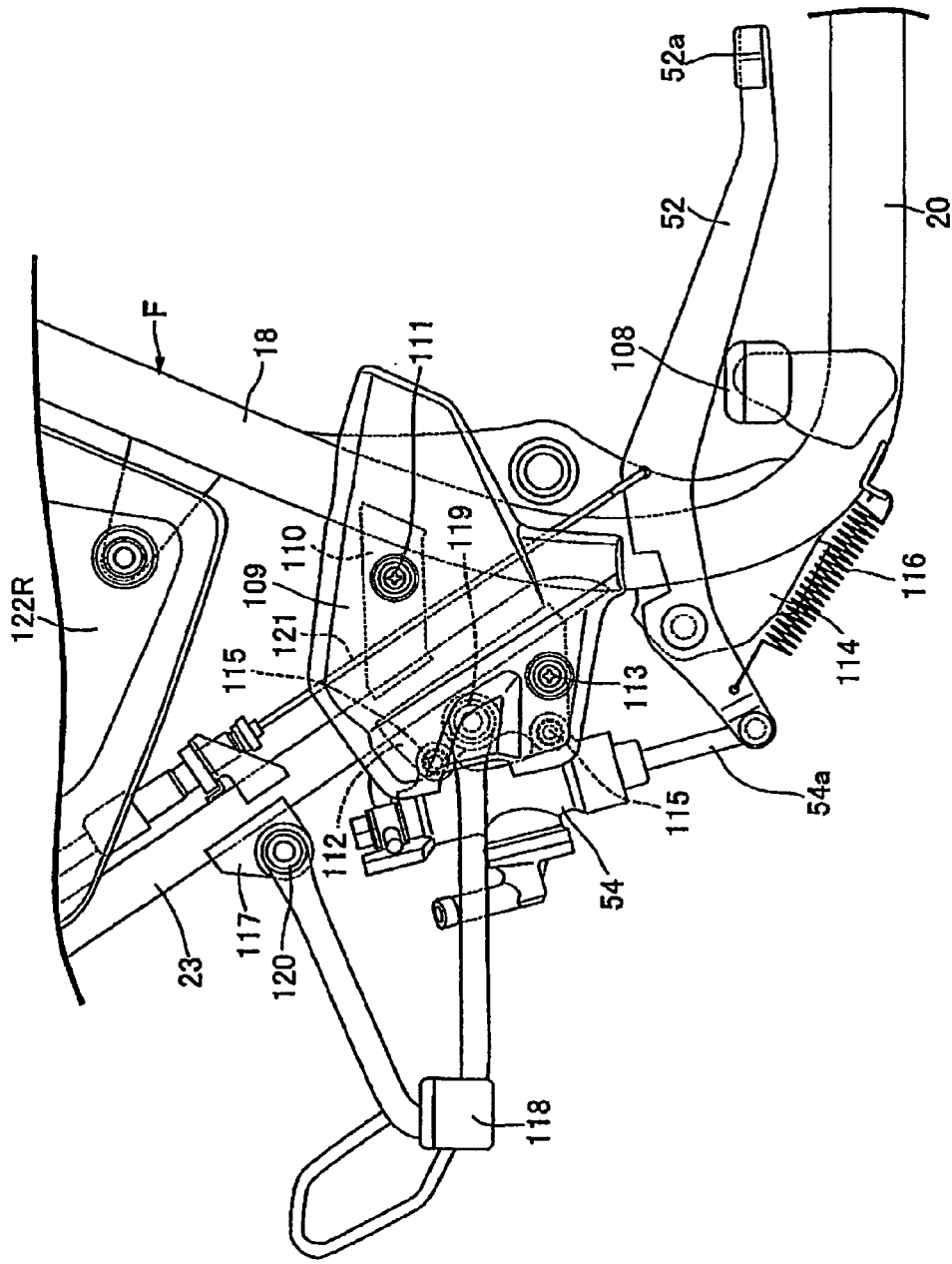
FIG. 10 is an enlarged view showing a part shown by an arrow 10 in FIG. 2.

As shown in FIG. 10, a step 108 is provided to the rear of each lower pipe 20 to enable the rider seated on the seat 41 to put his/her foot thereon. When viewed from the outside, a portion in which each center pipe 18 and each rear stay 23 are linked is covered with respective heel guards 109, which is opposite to a heel of the foot put on each step 108 from the inside.

Each heel guard 109 is fastened to respective coupling pipe 110 that couples lower portions of each center pipe 18 and each rear stay 23 by each screw 111, and is fastened to each respective bracket 112 provided to a rear face of the lower portion of each rear stay 23 by each respective screw 113.

An intermediate portion of the brake pedal 52 is provided with a pedal portion 52a at one end thereof. The brake pedal 52 is turnably supported by a supporting plate 114 fastened to a rear face of the lower end of the right center pipe 18 below the bracket 112. The other end of the brake pedal 52 is coupled to a piston rod 54a of the master cylinder 54 attached to the bracket 112 by a pair of bolts 115. A return spring 116 is provided between a rear end of the lower pipe 20 and the brake pedal 52.

Further, each pillion step 118 is fastened to the bracket 112 and a bracket 117 provided to the rear face of each respective rear stay 23 above the bracket 112 by bolts 119, 120. The heel guard 109 covers the bracket 112 that supports the master cylinder 54, and also covers a cable 121 having one end thereof coupled to the brake pedal 52 to connect to a brake switch (not shown), and which is extended rearwardly and upwardly along each rear stay 23.

Both sides of the seat rails 21 and the rear stays 23 respectively of the body frame F below the seat 41 are covered with a pair of left and right rear side covers 122L, 122R. On one side in a lateral direction of the rear wheel WR, that is, on the right side (in the illustrative embodiment), the muffler assembly 80 including the muffler 78 is arranged.

The muffler is arranged on the downside of the right rear side cover 122R. An upper edge of the muffler 78 is extended along a lower edge of the right rear side cover 122R, and is extended in the longitudinal direction with the muffler inclined rearwardly and upwardly. The muffler cover 79 covers the muffler 78 from the upside and from the outside. The muffler cover has a substantially L-type (L-shaped) cross section.

Figure 11:
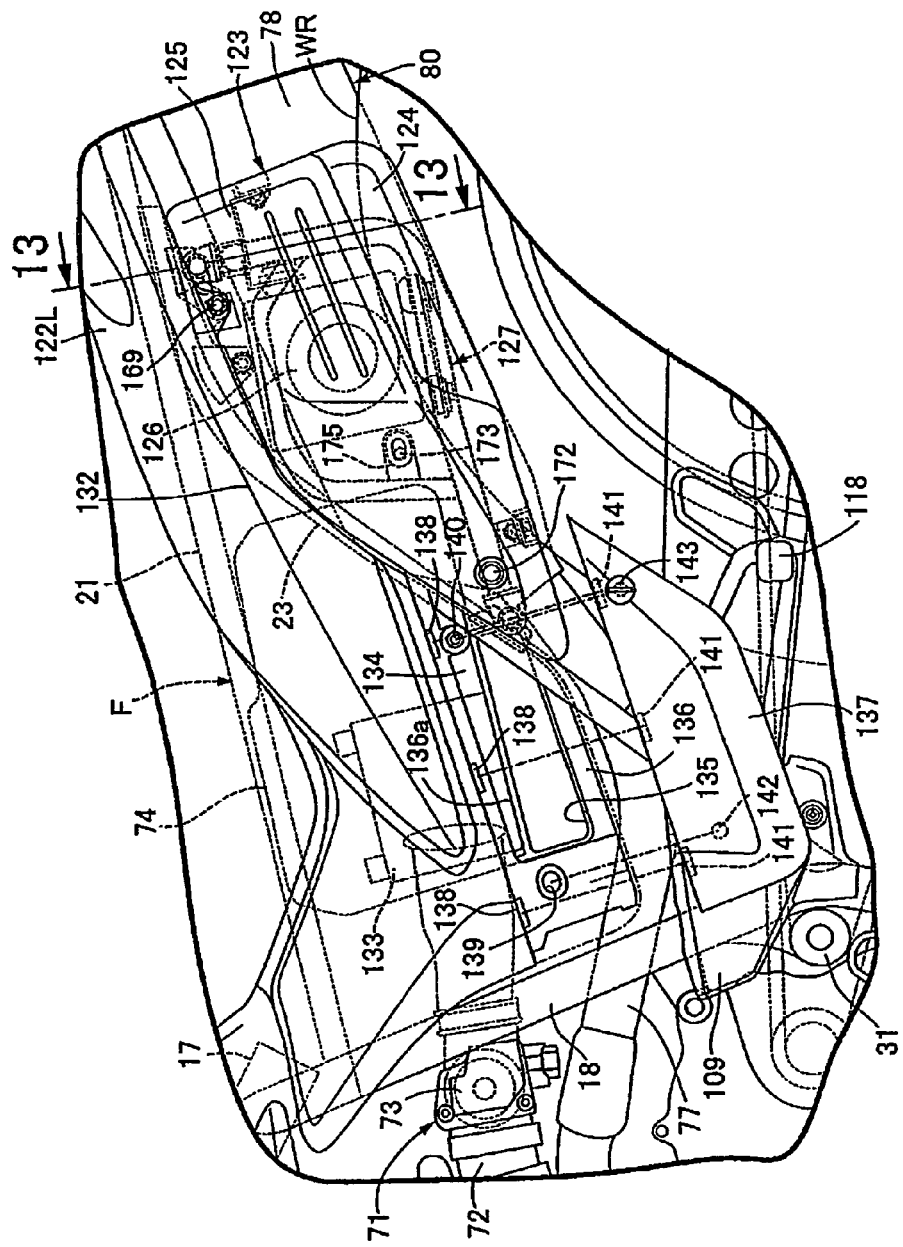
FIG. 11 is an enlarged view showing a part shown by an arrow 11 in FIG. 1.

Further, on the other side of the rear wheel WR, in the lateral direction, that is, on the left side of the rear wheel WR in the illustrative embodiment, as shown in FIGS. 1 and 11, a single housing box 123 having a shape similar to the muffler assembly 80 and forming a pseudo muffler assembly 80 (replica muffler assembly) is extended in the longitudinal direction on the downside of the left rear side cover 122L and arranged substantially parallel to the muffler assembly 80.

Figure 12:
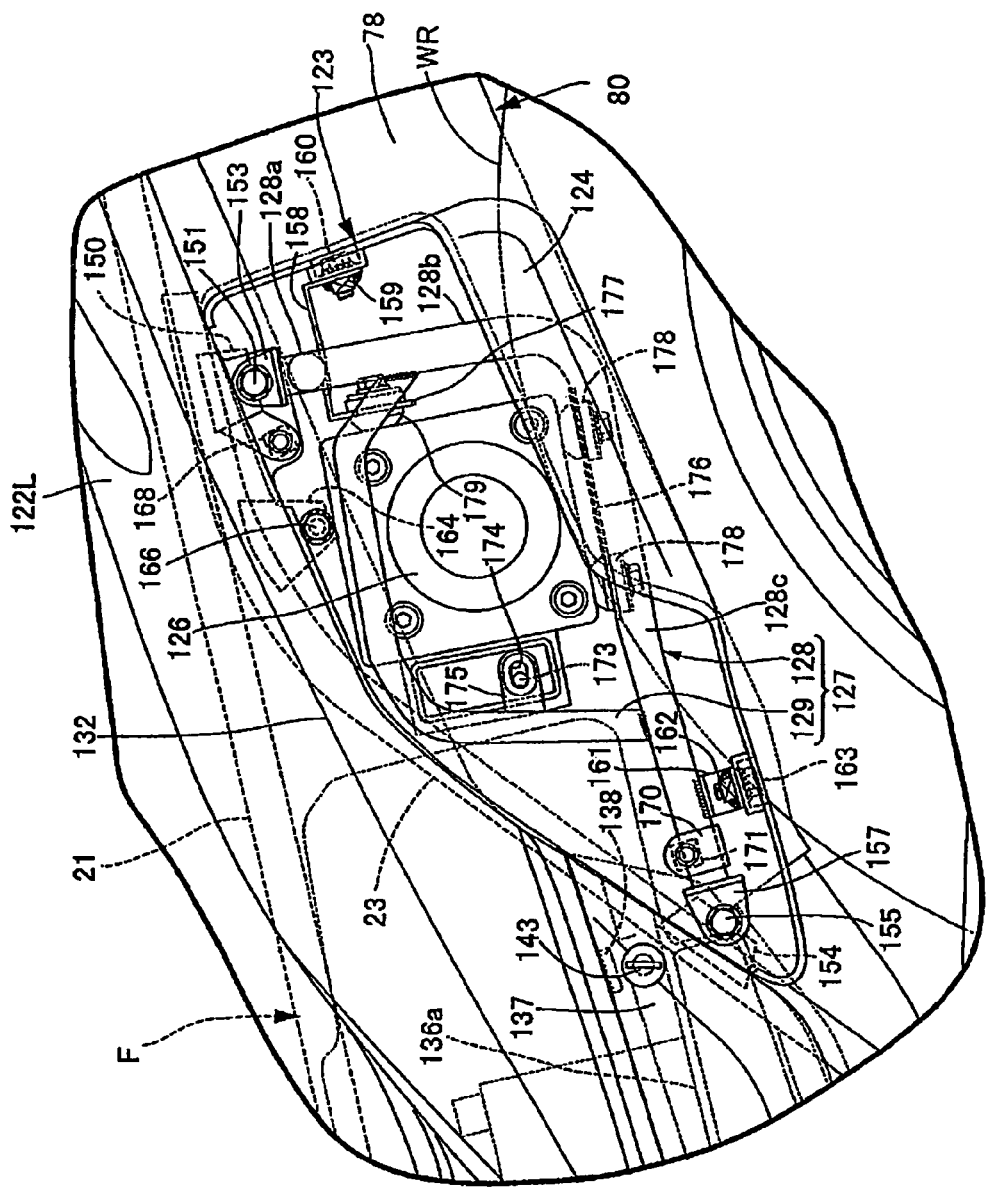
FIG. 12 is a side view showing the vicinity of a housing box a lid of which is removed.
Figure 13:
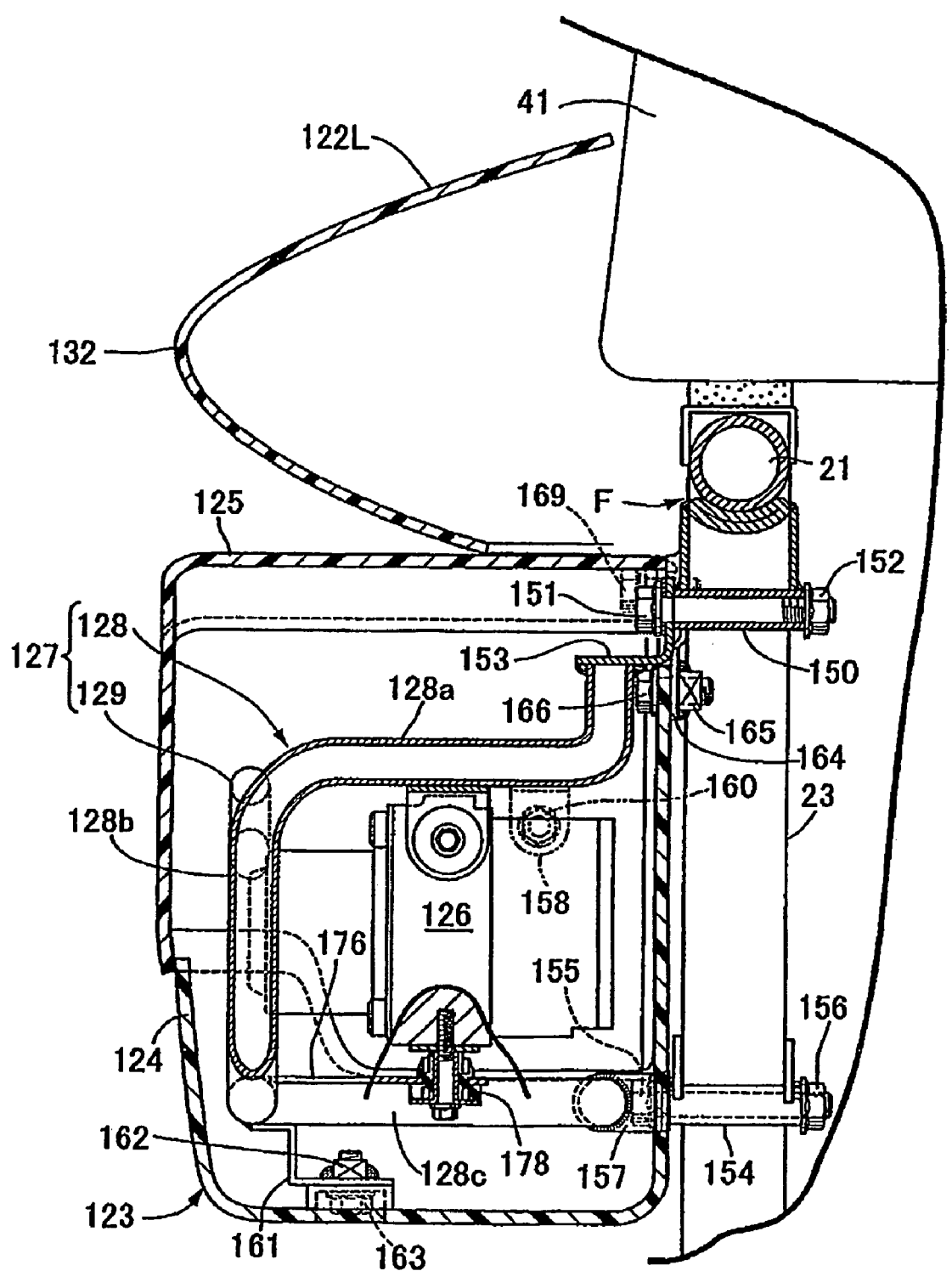
FIG. 13 is a sectional view viewed along a line 13-13 in FIG. 11.

Also as shown in FIGS. 12 and 13, the housing box 123 includes a box body 124 and a lid 125 that closes an opening of the box body 124. The upside of the box body 124 is open upwardly and outwardly. The housing box 123 is supported by the left rear stay 23 of the body frame F and a guard 127 attached to the rear stay 23. The lid 125 of the housing box 123 has the same color (or a similar color) as the muffler cover 79. The lid 125 is formed substantially in the same shape (or a similar shape) as the muffler cover 79.

The guard 127 is formed by connecting first and second frames 128, 129 configured by a bent metallic pipe. A first mounting plate 153 fastened to a bracket 150 by bolts 151, 152, provided at a rear end of the left rear stay 23, is provided at one end of the first frame 128. At the other end of the first frame 128, a second mounting plate 157 is fastened to a bracket 154 provided in an intermediate portion of the rear stay 23 by bolts 155, 156 on the upsides of mounted positions of the pillion steps 118.

The first frame 128 is configured by an upper frame portion 128a at an inner end of which the first mounting plate 153 is provided and which is extended outward in a slightly lower position from the first mounting plate 53, an intermediate frame portion 128b extended downward from an outer end of the upper frame portion 128a and a lower frame portion 128c which is extended forward from a lower end of the intermediate frame portion 128b and at a front end of which the second mounting plate 157 is provided. A part in front of an intermediate portion of the lower frame portion 128c is inclined inwardly in the vehicle-width direction toward the front.

The second frame 129 is bent substantially in an L type (L-shaped profile). Both the ends of the second frame 129 are connected to an upper portion of the intermediate frame portion 128b in the first frame 128 and the intermediate portion of the lower frame portion 128c in the first frame 128 by welding and others.

A supporting plate 158 opposite to a side wall of the rear of the box body 124 from the front side is provided to the upper frame portion 128a in the guard 127. A bolt 160 that pierces the side wall of the rear of the box body 124 and the supporting plate 158 from the outside of the box body 124 is screwed to a weld nut 159 fastened to the supporting plate 158.

A supporting plate 161 opposite to a bottom wall of the front of the box body 124 from the upside is provided to the front of the lower frame portion 128c in the guard 127. A bolt 163 that pierces a bottom wall of the front of the box body 124 and the supporting plate 161 from the downside of the box body 124 is screwed to a weld nut 162 fastened to the supporting plate 161.

Further, a stay 164 opposite to an upper portion of the box body 124 from the side of the body frame F is provided to the left rear stay 23 in front of the bracket 150. A bolt 166 that pierces the box body 124 and the stay 164 from the inside of the box body 124 is screwed to a weld nut 165 fastened to the stay 164.

In other words, the box body 124 is supported by the guard 127 attached to the left rear stay 23 of the body frame F with the guard housed in the box body 124 and the left rear stay 23.

A cross section of the lid 125 is formed substantially in an L type (L-shaped profile) to close the opening of the box body 124. The lid 125 is detachably attached to the left rear stay 23 and the guard 127 so that the lid can be attached/detached in the vehicle-width direction.

In other words, a weld nut 168 is fastened to the bracket 150 provided to the left rear stay 23. A bolt 169 that pierces an upper portion of the lid 125 and the bracket 150 is screwed to the weld nut 168. A stay 170 to which a weld nut 171 is fastened is provided at the front of the lower frame portion 128c in the guard 127. A bolt 172 that pierces the front of the lid 125 and the stay 170 is screwed to the weld nut 171.

A positioning member 175 having, a fitting hole 174 formed therein, into which a positioning projection 173 protruded inside the lid 125 is fitted is provided at the front of the second frame 129 in the guard 127.

Braking force produced by the disc brake BF for the front wheel and the disc brake BR for the rear wheel so as to avoid a situation that the front wheel WF and the rear wheel WR are locked when the disc brake BF for the front wheel and the disc brake BR for the rear wheel are operated is controlled by a single ABS modulator 126 common to the disc brake BF for the front wheel and the disc brake BR for the rear wheel.

The ABS modulator 126 is arranged at least on one side in the lateral direction of the rear wheel WR, on the left side of the rear wheel WR in the illustrative embodiment, on the downside of a passenger seated on the rear of the tandem seat 41 and at the back of a passenger's foot put on the pillion step 118. The ABS modulator is housed in the housing box 123.

In addition, in the housing box 123, the guard 127 is housed and the ABS modulator 126 is attached to the guard 127. That is, a lower portion of the ABS modulator 126 is attached to a supporting plate 176 provided to the lower frame portion 128c in the guard 127 via two pieces of mounting rubber 178, for example. The rear side of the ABS modulator 126 is attached to a supporting plate 177 provided to the intermediate frame portion 128b in the guard 127 via mounting rubber 179.

In addition, a portion of the first frame 128 and the second frame 129 of the guard 127 are arranged outside the ABS modulator 126 attached to the guard 127. The ABS modulator 126 is attached to the guard 127 such that the ABS modulator is protected by the guard housed in the housing box 123.

Overhanged portions 132 overhanged sideways are provided to upper portions of the rear side covers 122L, 122R so as to widen both legs of the passenger to prevent the legs from approaching the rear wheel WR when the passenger seated on the rear of the tandem seat 41 puts both legs on the pillion steps 118. Specifically, the overhanged portion 132 of the right rear side cover 122R fulfills a function of preventing the right leg of the passenger from approaching the muffler 78.

A box-type glove compartment 136 is fixed on the left side of the air cleaner 74. The box-type glove compartment 136 opens leftwardly. The box-type glove compartment 136 is provided with a housing 134 for housing a battery 133 and a tool housing 135 arranged on the downside of the housing 134 via a partition 136a between the housing 134 and the tool housing 135.

The left rear side cover 122L is formed to cover an upper portion of the glove compartment 136. A lid plate 137 which openably closes the tool housing 135 is tightly connected to a lower portion of the left rear side cover 122L. A contour in which the left rear side cover 122L and the lid plate 137 are combined is equivalent to a contour corresponding to the right rear side cover 122R.

Three fitting holes 138, a concave portion 139 and a tapped hole 140 are provided to the lower portion of the left rear side cover 122L. The three fitting holes 138 are arranged in the longitudinal direction on the upside of the tool housing 135. The concave portion 139 is arranged in front of the tool housing 135. The tapped hole 140 arranged on the upside of the rear of the tool housing 135. Several fitting projections 141 fitted into each fitting hole 138 and a fitting projection 142 positioned and fitted into the concave portion 139 are protruded from the lid plate 137 and a screw 143 screwed into the tapped hole 140 is turnably installed.

Next, further explanation of the illustrative embodiment is provided.

The upper fender 85 covers a portion of the fuel tank 40 at rear ends on both sides from the outer, sidewardly portion. The upper fender 85 covers the lower fender 46 attached to the front fork 15, and also covers the front wheel WF from the upside further on the upside of the lower fender 46.

Each overhanged portion 107 in which each ridge line portion 107a linearly ranging to the lower edge of the upper fender 85, when viewed in a side view, is formed in the left and right front side cowls 96L, 96R. The left and right front side cowls 96L, 96R are detachably tightly connected to the upper fender 85 such that a portion of each front side cowl 96L, 96R is overlapped with the rear of the upper fender 85. The cross section overhanged portion 107 is substantially V-type overhanged outwardly in the vehicle-width direction.

Therefore, the upper fender 85 and the front side cowls 96L, 96R range, forming a streamline shape, the appearance quality can be enhanced and the effect of rectification for smoothly conducting running wind rearwardly can be acquired. Also, during operation, air resistance can be reduced.

Since each front side cowl 96L, 96R and each shroud 97L, 97R that covers the oil cooler 47 attached to the front of the body frame F from the side are mutually coupled with the upper portion of each shroud 97L, 97R overlapped with the lower portion on the rear side of each front side cowl 96L, 96R from the side and the airflow routing groove 105 extended in the longitudinal direction and open downward is formed between the lower portion of each front side cowl 96L, 96R and the upper portion of each shroud 97L, 97R, running wind that gets inside the front side cowls 96L, 96R and the shrouds 97L, 97R can be rectified by the airflow routing grooves 105.

In addition, the cutout 103 that forms the exhaust port 102 is provided to the upper portion of each shroud 97L, 97R. The cutout 103 ranges with the airflow routing groove 105 and is vertically directed between each shroud and the lower portion on the rear side of each front side cowl 96L, 96R. Therefore, the exhaust port 102 can be easily formed between the lower portion on the rear side of each front side cowl 96L, 96R and the upper portion of each shroud 97L, 97R with a simple configuration.

Using the described arrangement, the cutout 103 is only provided to the upper portion of each shroud 97L, 97R, such that running wind that gets inside the front side cowls 96L, 96R and the shrouds 97L, 97R is exhausted on the downsides of the shrouds 97L, 97R, and residual running wind can be exhausted upwardly from each exhaust port 102.

Since each overhanged portion 107 is provided to each front side cowl 96L, 96R by vertically forming each upper inclined portion 107b inclined to be located on the upside toward the inside in the vehicle-width direction, and extended to the upper portion on the front side of the fuel tank 40 and each lower inclined portion 107c inclined to be located on the downside toward the inside in the vehicle-width direction, and extended to the lower portion on the front side of the fuel tank 40 on the upside and on the downside of each ridge line portion 107a, rider's comfort can be enhanced by effectively conducting running wind on the side of the rider along each upper inclined portion 107b, vertically separating the running wind in each overhanged portion 107 and enhancing the effect of rectification. As the effect of rectification can be acquired in each overhanged portion 107 of each front side cowl 96L, 96R even if the shrouds 97L, 97R are removed, various appearance can be enjoyed.

Since the bent line 107d bent with the bent line protruded outward in the vehicle-width direction, and extended in the longitudinal direction is formed in the intermediate portion of the lower inclined portion 107c and the portion lower than the bent line 107d of the lower inclined portion 107c is abruptly inclined inwardly in the vehicle-width direction, compared with the portion higher than the bent line 107d, air on the upside of the exhaust port 102 is guided by the portion lower than the bent line 107d of the lower inclined portion 107c and is conducted outwardly in the vehicle-width direction, as shown in FIG. 9. Further, the air exhausted from the exhaust port 102 can be prevented from hitting on the rider seated on the seat 41.

Further, since the headlight cover 90 that covers the headlight 89 is protruded upwardly from the upper portion of the upper fender 85, and each concave portion 91 extended rearwardly and upwardly is formed on both sides of the headlight cover 90, running wind is conducted on the side of the rider by the concave portions 91. Accordingly, the comfort of the rider can be enhanced.

Since both sides of the body frame F are covered with the pair of left and right rear side covers 122L, 112R on the downside of the seat 41, the muffler assembly 80 including the single muffler 78 arranged under the right rear side cover 122R, and extended in the longitudinal direction and the muffler cover 79 covering the muffler 78 from the upside and from the outside and having the substantially L-type cross section is arranged on the right side of the rear wheel WR and the single housing box 123 having the similar shape to the muffler assembly 80 and forming the pseudo muffler assembly 80 is arranged on the left side of the rear wheel WR substantially in parallel with the muffler assembly 80 with the housing box extended in the longitudinal direction under the left rear side cover 122L, the vicinity of the rear of the vehicle body is prevented from being bulky because of the housing box and the promptness (a desired profile of rear portion of the vehicle) can be enhanced.

Besides, since the muffler assembly 80 and the housing box 123 respectively having substantially similar shape are arranged in the lateral direction of the rear wheel WR, the effect of rectification of running wind can be equalized in the lateral direction of the motorcycle. Further, since the housing box 123 looks similar to the muffler assembly 80, the appearance like twin mufflers can be acquired. Accordingly, a suitable motorcycle for a sport type can be provided.

Since the lid 125 that configures the housing box 123 in collaboration with the box body 124 covers the opening of the box body 124 detachably in the vehicle-width direction, the left rear side cover 122L located on the upside of the housing box 123 never obstructs the attachment/detachment of the lid 125. Accordingly, work for attaching/detaching the lid 125 can be easily facilitated.

Since the box body 124 is formed with the upper portion open upwardly and outwardly and the cross section of the lid 125 is formed substantially in the L type profile to close the opening of the box body 124, the opening of the box body 124 when the lid 125 is removed is enlarged. Accordingly, work for housing a housed article in the housing box 123 and work for removing it can be easily facilitated.

In addition, as the lid 125 has the same (or substantially similar) color as the muffler cover 79 and has the substantially same shape as the muffler cover 79, the housing box 123 looks like the muffler assembly 80. Accordingly, an appearance like twin mufflers can be more easily acquired.

Since the ABS modulator 126 is arranged at least on one side in the lateral direction of the rear wheel WR, for example, on the left side of the rear wheel WR in the illustrative embodiment, so as to prevent the front wheel WF and the rear wheel WR from being locked when the disc brake BF for the front wheel and the disc brake BR for the rear wheel are operated, the ABS modulator 126 is arranged in dead space. Accordingly, a degree of freedom in layout is enhanced. Also, the vehicle body can be configured compactly by the arrangement of the ABS modulator 126.

In addition, since the ABS modulator 126 is housed in the housing box 123, the ABS modulator 126 is hidden. Accordingly the ABS modulator 126 can be protected and the appearance quality of the motorcycle is enhanced.

Since the guard 127, which protects the ABS modulator 126 and which is housed in the housing box 123, is attached to the left rear stay 23 in the rear of the body frame F and the ABS modulator 126 is attached to the guard 127, the ABS modulator 126 is protected by the guard 127. The guard 127 also fulfills a function as a bracket via which the ABS modulator 126 is supported by the body frame F.

Since the position of mounting of the ABS modulator 126 can be adjusted by changing the shape of the guard 127, a degree of freedom in the layout of the ABS modulator 126 in the housing box 123 can be enhanced. In addition, as the guard 127 is housed in the housing box 123 together with the ABS modulator 126, the appearance quality can be also made excellent.

Since the ABS modulator 126 is arranged on the downside of the passenger seated on the rear of the tandem seat 41 and at a position rear of the passenger's foot put on each pillion step 118, the ABS modulator 126 can be prevented from hitting on the passenger's foot.

In addition, as the muffler 78 and the ABS modulator 126 are arranged on both sides of the rear wheel WR, the weight on the side of the housing box 123 is made close to the weight on the side of the muffler assembly 80. Accordingly, the lateral weight balance can be improved.

The embodiment of the present invention has been described, however, the present invention is not limited to the embodiment and various design changes without deviating from the present invention described in the scope of claims are allowed.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A sport-type motorcycle, comprising a body frame; a rear wheel operatively attached to the body frame; a muffler assembly including a muffler and a muffler cover covering at least a laterally outer side portion of the muffler, said muffler assembly being arranged on one of a right side and a left side of the rear wheel in a lateral direction; and a housing box, arranged on the other of the right side and the left side of the rear wheel, said housing box being operatively attached to a rear portion of said body frame; wherein the housing box has a shape substantially similar to a shape of the muffler assembly thereby forming a pseudo muffler assembly, wherein said pseudo muffler assembly is oriented substantially parallel to the muffler assembly when viewed in plan; wherein said housing box comprises: a box body having an opening formed therein at an upper portion thereof, said opening being open from the upper and outer side portions of said box body, and a lid having a substantially L-shaped cross section, said lid being operable to close and open said opening of the box body, and being attached/detached in a vehicle-width direction for covering the box body; wherein a shape of said lid is substantially similar to a shape of the muffler cover; and wherein a color of said lid is substantially similar to a color of said muffler cover.

2. A motorcycle according to claim 1, wherein the muffler cover has a substantially L-shaped cross section; and wherein the muffler cover covers an upper portion of the muffler and the laterally outer side portion thereof.

3. A motorcycle according to claim 2, further comprising a seat attached at a rear portion of the body frame; and a pair of left and right rear side covers disposed below the seat; wherein left and right lateral portions of the body frame are spaced from each other and are covered with said left and right rear side covers below the seat; wherein the muffler assembly is arranged under one of said and right rear side covers; and wherein the housing box is arranged under the other of said left and right rear side covers.

4. A motorcycle according to claim 2, further comprising an ABS modulator disposed in said housing box, wherein said ABS modulator is operable to execute antilock braking control during vehicle operation.

5. A motorcycle according to claim 1, further comprising a seat attached at a rear portion of the body frame; and a pair of left and right rear side covers disposed below the seat; wherein left and right lateral portions of the body frame are spaced from each other and are covered with said left and right rear side covers below the seat; wherein the muffler assembly is arranged under one of said and right rear side covers; and wherein the housing box is arranged under the other of said left and right rear side covers.

6. A motorcycle according to claim 1, further comprising an ABS modulator disposed in said housing box, wherein said ABS modulator is operable to execute antilock braking control during vehicle operation.

7. A motorcycle according to claim 1, wherein said muffler cover is attached to the muffler.

8. A motorcycle according to claim 1, wherein said muffler extends to a level above an upper portion of the rear wheel.

9. A sport-type motorcycle comprising a body frame; a muffler assembly arranged on one of a right side and a left side of a rear wheel; and a pseudo muffler assembly arranged on the other of said right side and said left side of the rear wheel; wherein a shape and size of said pseudo muffler is substantially similar to a shape and size of said muffler assembly; wherein said muffler assembly comprises a muffler; and a muffler cover for covering at least a portion of the muffler; wherein said pseudo muffler assembly comprises a housing box having an opening formed therein; said housing box configured to receive an operating element of the motorcycle therein; and a lid for covering the said opening of the housing box; wherein said muffler assembly and said pseudo muffler assembly are arranged substantially symmetrically and are parallel in plan view to each other on opposite sides of a longitudinal axis of the motorcycle; and wherein a weight of said muffler assembly is substantially similar to a weight of said pseudo muffler assembly having said operating element disposed in the housing box, thereby achieving a substantially balanced weight at a rear portion of the motorcycle.

10. A motorcycle according to claim 9, wherein the muffler cover has a substantially L-shaped cross section; and wherein the muffler cover covers the muffler from upper and laterally outer side portions thereof.

11. A motorcycle according to claim 9, wherein said muffler cover and said lid each have a substantially L-shaped cross section; and wherein a color of said lid is substantially similar to a color of said muffler cover.

12. A motorcycle according to claim 9, wherein said operating element is an ABS modulator, which is operable to execute antilock braking control during operation of the motorcycle.

13. A motorcycle according to claim 9, further comprising a tandem seat situated above said longitudinal axis, said tandem seat arranged between said muffler assembly and said pseudo muffler assembly.

14. An off-road motorcycle comprising a body frame; a rear wheel operatively attached to the body frame; a seat arranged at a rear portion of the body frame and situated above a longitudinal axis of the body frame; a muffler assembly arranged on one of a right side and a left side of the rear wheel; and a pseudo muffler assembly arranged on the other of said right side and said left side of the rear wheel; wherein a shape and size of said pseudo muffler is substantially similar to a shape and size of said muffler assembly; wherein said muffler assembly comprises a muffler; and a muffler cover covering at least a portion of the muffler; wherein said pseudo muffler assembly comprises a housing box having an opening formed therein; said housing box configured to receive an operating element of the motorcycle therein; and a lid for covering the said opening of the housing box; and wherein said muffler assembly and said pseudo muffler assembly are arranged substantially symmetrically and are parallel in plan view to each other on opposite sides of a longitudinal plane of the motorcycle; and wherein a weight of said muffler assembly is substantially similar to a weight of said pseudo muffler assembly having said operating element disposed in the housing box, thereby achieving a substantially balanced weight at a rear portion of the motorcycle.

15. A motorcycle according to claim 14, wherein the muffler cover has a substantially L-shaped cross section; and wherein the muffler cover covers the muffler from upper and laterally outer side portions thereof.

16. A motorcycle according to claim 14, wherein said muffler cover and said lid each have a substantially L-shaped cross section; and wherein a color of said lid is substantially similar to a color of said muffler cover.

17. A motorcycle according to claim 14, wherein said operating element is an ABS modulator, which is operable to execute antilock braking control during operation of the motorcycle.

* * * * *